US008190580B2

(12) United States Patent
Watanabe et al.

(10) Patent No.: US 8,190,580 B2
(45) Date of Patent: May 29, 2012

(54) SYSTEM AND METHOD FOR DATA BACKUP USING LOG RECORDS

(75) Inventors: Satoru Watanabe, Fuchu (JP); Yoshio Suzuki, Kokubunji (JP); Shinji Fujiwara, Sagamihara (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 925 days.

(21) Appl. No.: 12/193,978

(22) Filed: Aug. 19, 2008

(65) Prior Publication Data

US 2009/0248755 A1 Oct. 1, 2009

(30) Foreign Application Priority Data

Mar. 28, 2008 (JP) .................................. 2008-85943

(51) Int. Cl.
*G06F 17/30* (2006.01)
(52) U.S. Cl. ....................................................... 707/672
(58) Field of Classification Search .......... 707/640–655, 707/672–686
See application file for complete search history.

(56) References Cited

U.S. PATENT DOCUMENTS

| 7,831,561 B2* | 11/2010 | Wertheimer et al. ......... 707/640 |
| 7,895,167 B2* | 2/2011 | Berg et al. ..................... 707/672 |
| 8,041,283 B2* | 10/2011 | Murai ............................ 399/367 |
| 8,051,043 B2* | 11/2011 | Young ............................ 707/646 |
| 2004/0193583 A1 | 9/2004 | Suzuki et al. |
| 2005/0198456 A1 | 9/2005 | Watanabe et al. |
| 2007/0180211 A1 | 8/2007 | Takaoka et al. |
| 2007/0271475 A1 | 11/2007 | Hatasaki et al. |

FOREIGN PATENT DOCUMENTS

| JP | 2000-250771 A | 9/2000 |
| JP | 2007-141047 A | 6/2007 |
| JP | 2007-310791 | 11/2007 |

OTHER PUBLICATIONS

"Evaluation of Remote Backup Algorithms for Transaction-Processing Systems" by Christos A. Polyzois, et al., vol. 19, Issue 3, Sep. 1994.

* cited by examiner

*Primary Examiner* — Wilson Lee
(74) *Attorney, Agent, or Firm* — Mattingly & Malur, PC (57) ABSTRACT

To generate backup data based on a log while a power consumption of a standby system is reduced, method for data backup is provided in which a first computer system transmits a data update record, a second storage system of a second computer system receives and then stores the data update record, and a second computer of the second computer system generates a copy of data contained in the first computer system based on the stored data update record. The method for data backup includes monitoring the data update record transmitted by the first computer system, and stopping, when a predetermined first condition is satisfied, the second computer; and starting, when a predetermined second condition is satisfied, the second computer, thereby generating the copy of the data contained in the first computer system based on the stored data update record.

6 Claims, 7 Drawing Sheets

| STANDBY ELECTRIC ENERGY | OPERATION ELECTRIC ENERGY | STARTUP ELECTRIC ENERGY | STARTUP PERIOD |
|---|---|---|---|
| 1W | 1000W | 2000W | 600 SECONDS |

SYSTEM AND METHOD FOR DATA BACKUP USING LOG RECORDS

CLAIM OF PRIORITY

The present application claims priority from Japanese application P2008-85943 filed on Mar. 28, 2008, the content of which is hereby incorporated by reference into this application.

BACKGROUND OF THE INVENTION

This invention relates to a backup system and a storage system, and more particularly, to a backup system and a storage system using a log.

Data backup systems employing two computer systems are widely used. The data backup in this context implies a process of generating the same data as data contained in one computer system, and saving the generated data to the other computer system. The source computer system of the backup is referred to as an active system, and the destination computer system of the backup is referred to as a standby system. Moreover, data to be saved to the standby system is referred to as backup data. CHRISTOS A. POLYZOIS, HECTOR GARCIA-MOLINA, "Evaluation of Remote Backup Algorithms for Transaction-Processing Systems", ACM Transactions on Database Systems, Vol. 19, No. 3, September 1994, Pages 423-449, for example, describes backup of data carried out by a duplex system.

Methods for the backup on the duplex system include a log transfer method. The log transfer method involves transferring a data update record (log) of the active system to the standby system, and generating backup data on the standby system. In the log transfer method, the backup data on the standby system is made coincident with the data on the active system when the backup starts. After the backup starts, a data update record of the active system is transferred to the standby system. The standby system updates the backup data based on the transferred data update record, thereby generating latest backup data. The log transfer method is described in CHRISTOS A. POLYZOIS, HECTOR GARCIA-MOLINA, "Evaluation of Remote Backup Algorithms for Transaction-Processing Systems", ACM Transactions on Database Systems, Vol. 19, No. 3, September 1994, Pages 423-449.

Generally, a computer system includes an external storage system. The external storage system is a device which stores data on the computer system, and includes a hard disk or a disk array, which are magnetic storage systems.

Some external storage systems have a function of copying data between two systems. For example, an external storage system SANRISE9980V available from Hitachi Ltd. has a Hitachi True Copy function. The Hitachi True Copy function is a function of copying data on one SANRISE9980V to another SANRISE9980V by migrating the data over a network. When data is added to the external storage system of the source of copy, the same data is added to the external storage system of the destination of copy. Moreover, when data is overwritten on the external storage system of the source of copy, corresponding data is overwritten on the external storage system of the destination of copy.

The backup based on the log transfer method is carried out by a copy function of the external storage system. A description will now be given of a mechanism thereof. When the backup starts, the backup data on the standby system is made coincident with the data on the active system. A setting is made for copying a data update record between the external storage system of the active system and the external storage system of the standby system. When a data update record is added to the external storage system of the active system, the same data update record is added to the external storage system of the standby system. On the standby system, a server device updates the backup data based on a copied data update record, thereby generating the latest backup data.

A technology of notifying the server device of commands such as those for turning on/off a power supply is disclosed in JP 2007-310791 A. By employing the technology disclosed in JP 2007-310791 A, it is possible to carry out operations such as those for turning on/off the power supply for the server device via a network.

In general, an operation electric energy consumed by the server device when the power supply is turned on is larger than a standby electric energy consumed by the server device when the power supply is turned off. Accordingly, by properly controlling the power supply for the server device, it is possible to largely reduce the power consumption of the computer system.

SUMMARY OF THE INVENTION

Conventionally, in a backup system using the log transfer method, the power supply for a server device of a standby system is always turned on. As a result, there poses a problem that the power consumption of the standby system is large. When a control of turning off the power supply for the server device of the standby system is carried out in order to reduce the power consumption, there arise the following three problems.

A first problem is that the standby system cannot measure the capacity of the transferred data update record. Conventionally, the server device of the standby system monitors the capacity of the data update record. When the power supply for the server device of the standby system is turned off, the capacity of the transferred data update record is no longer measured.

A second problem is that generation of the backup data possibly takes a long period of time. Conventionally, the power supply for the server device is always turned on, and, as soon as a data update record is copied to the standby system, the contents thereof are reflected to backup data. When the power supply for the server device is turned off, the data update record is accumulated in the standby system. As a result, the generation of the backup data reflecting the data update record possibly takes a long period of time. When the generation of the backup data takes a long period of time, the convenience of the system decreases.

A third problem is that the control of turning off the power supply for the server device may not always reduce the power consumption. This is caused by the standby electric energy of the server device, and a control electric energy required for starting and stopping of the server device, and thus, when the power supply for the server device is frequently turned on and off, the power consumption increases.

This invention has been made in view of the above problems, and it is therefore an object of this invention to generate backup data based on a log while the power consumption of a standby system is reduced.

According to this invention, there is a system for data backup, comprising: a first computer system including: a data update unit for updating data; a data update record generating unit for generating a data update record of the updated data; and a data update record transmission unit for transmitting the data update record; a second computer system including: a data update record reception unit for receiving the data update record from the first computer system; a data update record storage unit for storing the received data update record; a log application unit for generating a copy of the data contained in the first computer system based on the stored data update record; and a backup data storage unit for storing the copy of the data; and a monitoring unit for monitoring the data update record transmitted by the first computer system, thereby instructing start and stop of the second computer system, wherein the second computer system comprises: a second computer including the data update record reception unit and the log application unit; and a second storage system including the data update record storage unit and the backup data storage unit, wherein the monitoring unit monitors the data update record transmitted by the first computer system, thereby transmitting an instruction for stopping the second computer when a predetermined first condition is satisfied, and transmitting an instruction for starting the second computer when a predetermined second condition is satisfied, and wherein the second computer comprises a communication unit for receiving the instruction from the monitoring unit, and controlling the start and stop of the second computer, and, when the second computer starts, causes the log application unit to function and to generate the copy of the data contained in the first computer system based on the data update record stored in the data update record storage unit.

According to this invention, since a second computer of a second computer system is started at a predetermined cycle, applies the data update record received by a storage system to the backup data, generates a copy of the data contained in a first computer system, and the second computer of the second computer system is stopped from a time point when a first condition is satisfied to a time point when a second condition is satisfied, it is possible to periodically generate backup data while the power consumption of the second computer system is reduced.

Moreover, by selecting an operation state which minimizes the power consumption of the server of the standby system based on the length of the period from the time point when the first condition is satisfied to the time point when the second condition is satisfied, and the standby power, the operation power, and the startup power of the second computer of the second computer system, thereby frequently starting the second computer of the second computer system, it is possible to prevent the power consumption from increasing compared with the case in which the second computer continuously operates.

DETAILED DESCRIPTION OF THE PREFERRED EMBODIMENTS

A description will now be given of embodiments of this invention with reference to the accompanying drawings.

This invention includes two embodiments. In one embodiment, a monitoring server carries out notification to a server device of a standby system, and, in the other embodiment, a storage system carries out the notification. A description will now be given of the two embodiments of this invention with reference to the drawings.

First Embodiment

Figure 1:
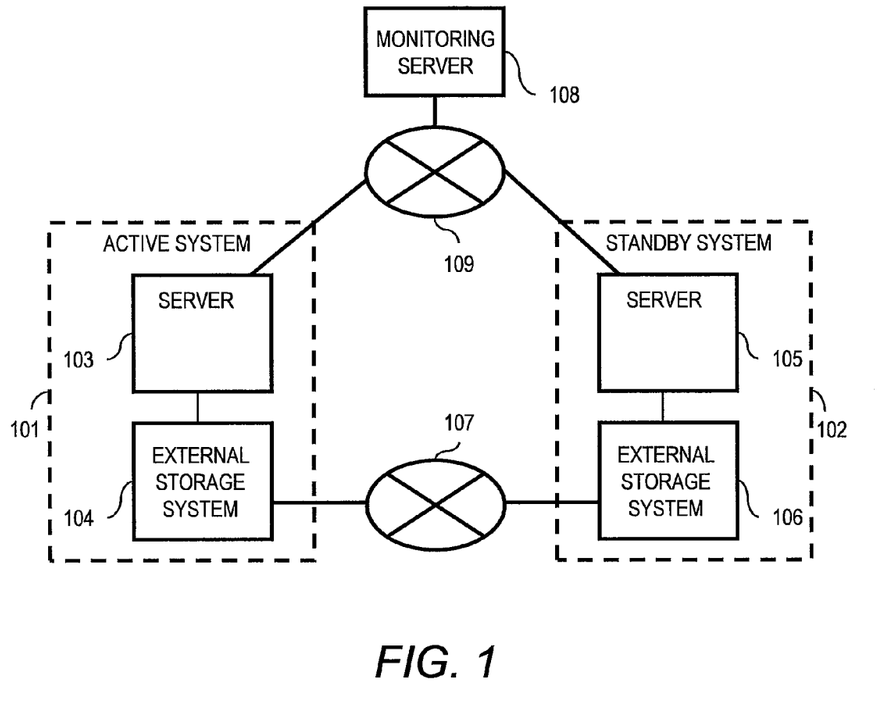
FIG. 1 shows a first embodiment, and is a block diagram of a data backup system based on a duplex system to which this invention is applied.

FIG. 1 shows a first embodiment, and is a block diagram of a data backup system based on a duplex system to which this invention is applied.

The data backup system based on the duplex system includes two computer systems. A source computer system of the backup is referred to as an active system 101, and a destination computer system of the backup is referred to as a standby system 102. The active system 101 includes a server 103 and an external storage system 104. The standby system 102 includes a server 105 and an external storage system 106. The external storage system 104 of the active system 101 and the external storage system 106 of the standby system 102 are coupled via a network 107. A monitoring server 108 is coupled to the server 103 of the active system 101 and the server 105 of the standby system 102 via a network 109. It should be noted that the server 103 of the active system 101 and the server 105 of the standby system 102 respectively include a processor and a memory to execute programs, and make access to data in the external storage systems 104 and 106.

Figure 2:
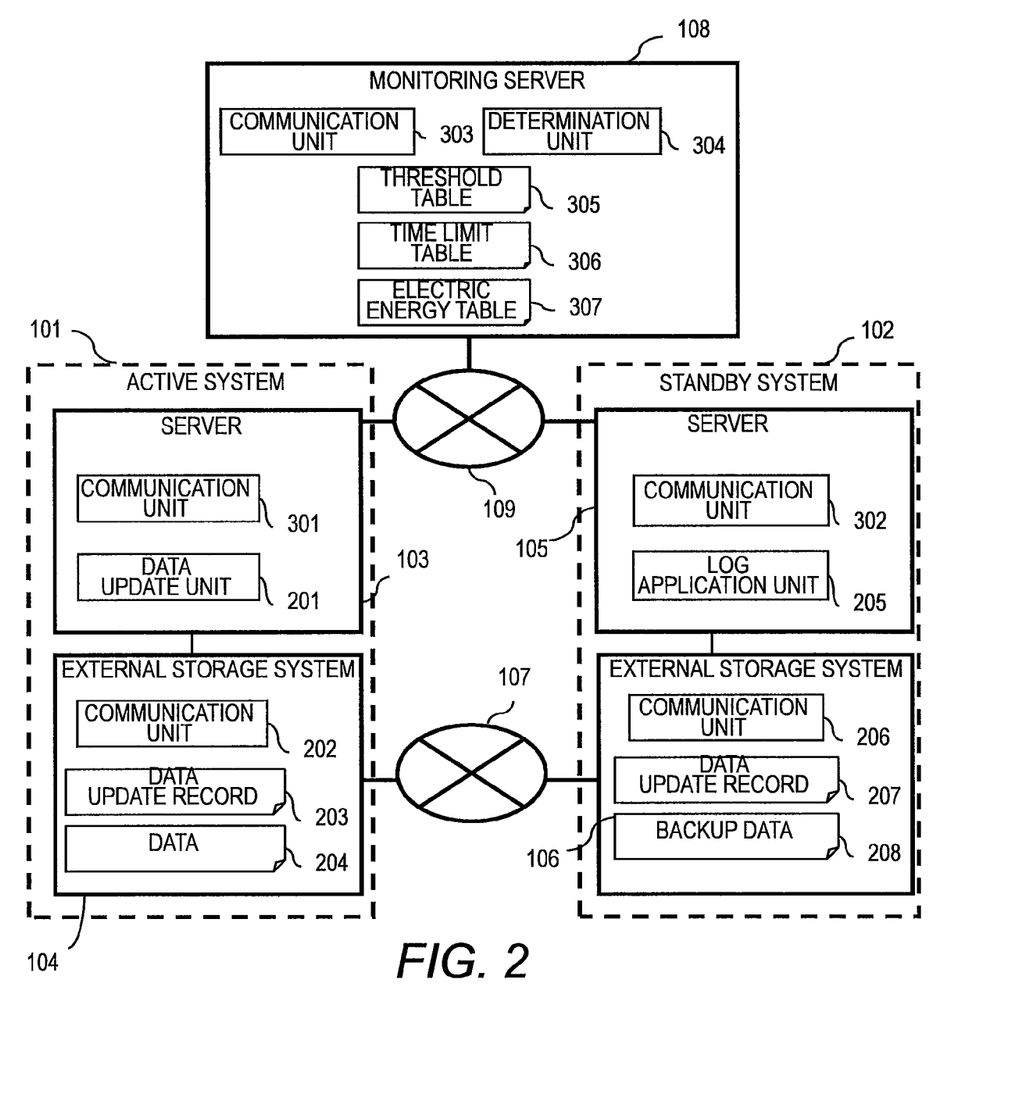
FIG. 2 is a block diagram showing functional elements of the computer system for generating the backup data.

FIG. 2 is a block diagram showing functional elements of the computer system for generating the backup data. The server 103 of the active system 101 includes a data update unit 201, and the data update unit 201 updates data 204 stored in the external storage system 104. The server 103 adds a history (log) describing an update of the data 204 to a data update record 203 of the external storage system 104. The content added to the data update record 203 is transmitted to the external storage system 106 of the standby system 102 by a communication unit 202 of the external storage system 104. In other words, the communication unit 202 has a remote copy function for migrating data from the active system 101 to the standby system 102.

A communication unit 206 of the external storage system 106 of the standby system 102 receives the data update record 203 from the active system 101, and the external storage system 106 of the standby system 102 writes the data update record 203 to a data update record 207. In the active system 101 and the standby system 102, the data update record 203 is copied from the external storage system 104 to the external storage system 106.

The server 105 of the standby system 102 includes a log application unit 205, and the log application unit 205 reflects the contents of the data update record 207 stored in the external storage system 106 to backup data 208. In other words, the log application unit 205 generates a copy of the data 204 contained in the active system 101 based on the data update record 207 of the external storage system 106. As a possible form, the data update unit 201 of the active system 101 is realized by a software program referred to as a database, for example.

Moreover, the server 103 of the active system 101 includes a communication unit 301 coupled to the network 109. The communication unit 301 notifies, at constant time intervals, a communication unit 303 of the monitoring server 108 of a capacity of transmission of the data update record 203, or a transmission speed of the data update record 203. For example, such data as that a data update record 203 of 100 megabytes is transmitted, or the data update record 203 is transmitted at 1 megabyte per second is notified by the server 103 to the monitoring server 108.

Moreover, the server 105 of the standby system 102 includes a communication unit 302 coupled to the network 109. This communication unit 302 can operate at a standby power alone which is consumed when the server 105 is in the standby state (stopped). The communication unit 302, according to a predetermined command received from the monitoring server 108, has a function of switching the server 105 of the standby system 102 from the standby state to the operation state, and a function of switching the server 105 from the operation state to the standby state. When the server 105 is in the operation state, the communication unit 302, at constant intervals, acquires, from the log application unit 205, a capacity of the data update record 207 which has not been reflected to the backup data 208. The communication unit 302, at constant intervals, notifies the communication unit 303 of the monitoring server 108 of the capacity of the data update record 207 which has not been reflected to the backup data 208.

Moreover, the communication unit 302 notifies the communication unit 303 of the monitoring server 108 of a fact that the capacity of the data update record 207 which has not been reflected to the backup data 208 has become equal to or less than a predetermined first threshold (such as 0 byte). In other words, when the log application unit 205 has reflected the entire data update record 207 to the backup data 208, the communication unit 302 of the server 105 notifies the monitoring server 108 of the fact that the reflection of the data update record 207 has been completed.

A determination unit 304 of the monitoring server 108, as described later, when the capacity of the data update record 207 has become equal to or less than the first threshold (such as zero), and thus, a predetermined condition is satisfied, determines whether the server 105 of the standby system 102 is to be set to the standby state. When the determination unit 304 determines to set the server 105 of the standby system 102 to the standby state, the determination unit 304 notifies the communication unit 302 of the server 105 of the standby system 102 of a server stop. When the communication unit 302 of the server 105 receives the notice of the server stop, the communication unit 302 sets the server 105 of the standby system 102 to the standby state.

Moreover, the determination unit 304 of the monitoring server 108, as described later, compares the capacity of the data update record 207 and a second threshold with each other, and determines whether to set the server 105 of the standby system 102 to the operation state. When the determination unit 304 determines to set the server 105 of the standby system 102 to the operation state, the determination unit 304 notifies the communication unit 302 of the server 105 of the standby system 102 of a server start. When the communication unit 302 of the server 105 of the standby system 102 receives the notice of the server start, the communication unit 302 sets the server 105 of the standby system 102 to the operation state. It should be noted that the monitoring server 108 includes a processor and a memory (not shown), and causes the determination unit 304 and the communication unit 303 to function.

Figure 3:
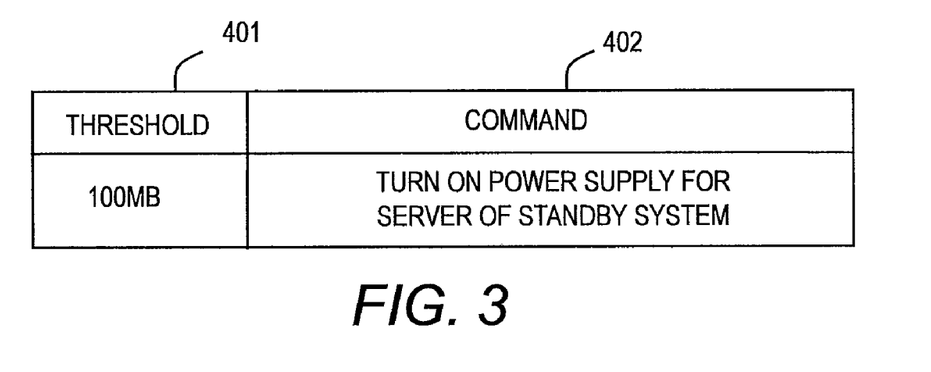
FIG. 3 describes contents of a threshold table 305 contained in the monitoring server 108.

FIG. 3 describes contents of a threshold table 305 contained in the monitoring server 108. In the threshold table 305, a threshold 401 and a command 402 are stored. The determination unit 304 of the monitoring server 108, when the capacity of the data update record 207 to which the data update record 203 output by the server 103 of the active system 101 is written exceeds a value set to the threshold 401, notifies the server 105 of the standby system 102 of a command stored in the command 402. In the example shown in FIG. 3, when the capacity of the data update record 207 to which the data update record 203 output by the server 103 is written exceeds 100 megabytes, the monitoring server 108 transmits a command for starting the server 105 of the standby system 102.

Figure 4:
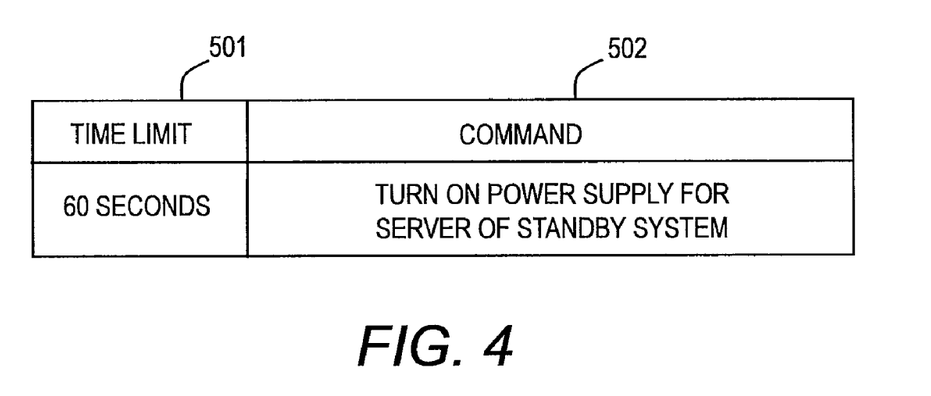
FIG. 4 describes contents of a time limit table 306 contained in the monitoring server 108.

FIG. 4 describes contents of a time limit table 306 contained in the monitoring server 108. In the time limit table 306, a time limit 501 and a command 502 are stored. In the example shown in FIG. 4, the time limit 501 is 60 seconds, and the command 502 stores a command for starting the server 105 of the standby system 102.

The determination unit 304 of the monitoring server 108, based on a communication speed of the data update record 207, a processing speed at which the log application unit 205 reflects the data update record 207 to the backup data 208, and the time limit 501, determines a timing for notifying the server 105 of the standby system 102 of the command 502 so that the entire data update record 207 is reflected to the backup data 208 within the time limit 501 of the time limit table 306. In other words, the determination unit 304 of the monitoring server 108 determines a timing so that the capacity of the data update record 207 which has not been reflected to the backup data 208 becomes zero within the time limit 501 after the notification of the command 502 (start command) to the server 105.

This timing is determined as follows, for example.

The communication speed of the data update record 203 transmitted by the server 103 of the active system 101 to the external storage system 106 of the standby system 102 is A bytes per second, the processing speed at which the log application unit 205 reflects the data update record 207 to the backup data 208 is B bytes per second, and the time limit 501 is C seconds.

Moreover, when the capacity of the data update record 207 which has not been reflected to the backup data 208 reaches the predetermined value (such as zero), the monitoring server 108 stops the server 105 of the standby system 102. An example in which the monitoring server 108 notifies the server 105 of the standby system 102 of the command 502 X seconds after the monitoring server 108 stops the server 105 of the standby system 102, thereby starting the server 105, is considered.

The capacity of the data update record 207 received by the standby system 102 for the X+C seconds is $(X+C) \times A$ bytes. A capacity of the data update record 207 which can be reflected to the backup data 208 by the log application unit 205 in C seconds after the monitoring server 108 notifies the server 105 of the standby system 102 of the command 502 is $C \times B$ bytes. Moreover, since, in C seconds after the monitoring server 108 notifies the server 105 of the standby system 102 of the command 502, the capacity of the data update record 207 which has not been reflected to the backup data 208 becomes zero, the following relationship holds.

$$(X+C) \times A - C \times B = 0$$

As a result, the period of X seconds, which represents the timing on which the server 105 of the standby system 102 is started after stop is given by the following equation.

$$X = C \times B / A - C$$

As a result, the determination unit 304 of the monitoring server 108 determines to notify the server 105 of the standby system 102 of the command 502 after C×B/A−C seconds.

With the above process, by causing the monitoring server 108 to monitor the transmission speed of the data update record 203 transmitted by the active system 101, setting the server 105 of the standby system 102 to the standby state for the period (X seconds) in which the data update record 207 (log) which has not been applied to the backup data 208 is accumulated to the second threshold in the external storage system 106 of the standby system 102, and thus applying the data update record 207 to the backup data 208 at the predetermined intervals (X+C seconds) according to the processing speed of the log application unit 205 while the power consumption of the standby system 102 is reduced, it is possible to simultaneously realize the redundancy and the low power consumption of the duplex system.

(First Variation)

Figure 5:
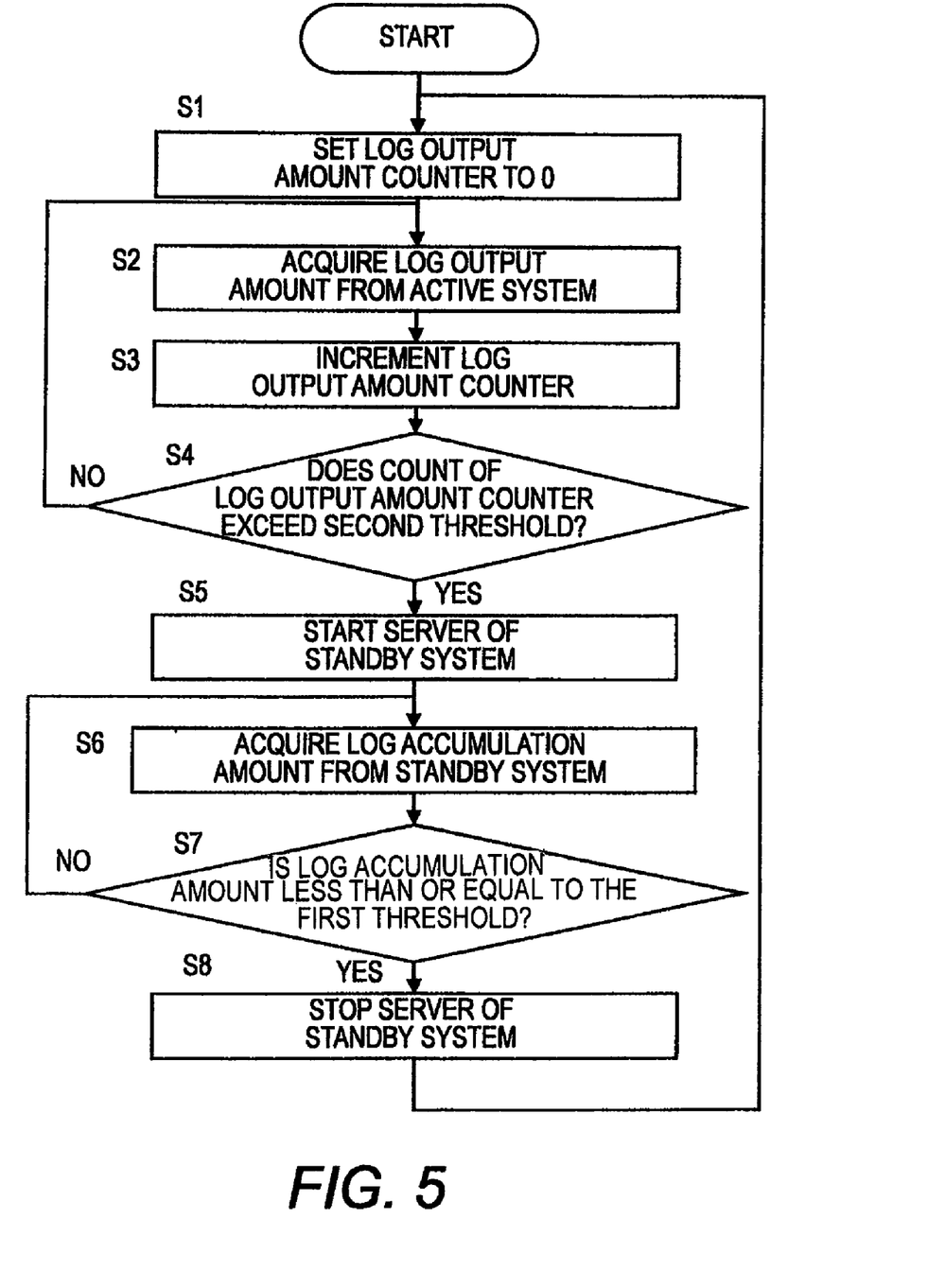
FIG. 5 is a flowchart showing an example of a process carried out by the monitoring server 108.

FIG. 5 is a flowchart showing an example of a process carried out by the monitoring server 108. This process is repeated on the monitoring server 108. In this example, the capacity of the data update record 203 transmitted by the server 103 of the active system 101 is monitored. When the capacity of the data update record 203 decreases below the first threshold, the server 105 of the standby system 102 is set to the stop state, and, when the capacity of the data update record 203 exceeds the second threshold, the server 105 is started, whereby the log application unit 205 of the server 105 of the standby system 102 applies the data update record 207 of the external storage system 106 to the backup data 208.

First, in Step S1, the monitoring server 108 resets a counter used for calculating the capacity of the data update record 203 transmitted by the server 103 of the active system 101 to zero. In Step S2, the monitoring server 108 acquires the capacity of the data update record 203 transmitted from the server 103 of the active system 101 to the server 105 of the standby system 102. In Step S3, the monitoring server 108 adds the capacity of the data update record 203 acquired from the server 103 to the counter.

In Step S4, the monitoring server 108 determines whether the count of the counter exceeds the second threshold, thereby monitoring the capacity of the data update record 207 which is accumulated in the external storage system 106 of the standby system 102 and has not been applied yet. When the count of the counter is equal to or less than the second threshold, the monitoring server 108 returns to Step S2, and repeats the process of acquiring the capacity of the data update record 203. On the other hand, when the count of the counter exceeds the second threshold, the monitoring server 108 proceeds to Step S5.

In Step S5, the monitoring server 108 instructs the server 105 of the standby system 102 to start, thereby starting the server 105. On the server 105 which has started, the log application unit 205 comes to function, and applies the data update record 207, which has not been applied, to the backup data 208. The backup data 208 is generated as a copy of the data 204 of the active system 101.

Then, in Step S6, the monitoring server 108 acquires the capacity of the data update record 207, which has not been applied to the backup data 208, from the server 105 of the standby system 102. Then, in Step S7, the monitoring server 108 determines whether the capacity of the data update record 207 which has not been applied to the backup data 208 has become equal to or less than the first threshold. When this unapplied capacity exceeds the first threshold, the monitoring server 108 returns to Step S6, and waits for the progress of the process carried out by the log application unit 205. On the other hand, when the unapplied capacity is equal to or less than the first threshold, the monitoring server 108 proceeds to Step S8, and transmits the stop command to the server 105 of the standby system 102, thereby setting the server 105 to the stop state.

As a result of the repetition of the above process, the data update record 203 transmitted by the server 103 of the active system 101 is monitored, the server 105 of the standby system 102, when the capacity of the data update record 207 which has not been applied to the backup data 208 exceeds the second threshold, is started, thereby causing the log application unit 205 to generate a copy of the data 204 of the active system 101, and the server 105, when the capacity of the data update record 207 which has not been applied to the backup data 208 becomes equal to or less than the first threshold, stops, thereby reducing the power consumption of the standby system 102.

(Second Variation)

A description will now be given of an example in which the determination unit 304 determines, in consideration of the standby electric energy and the start electric energy of the server 105 of the standby system 102, whether or not to set the server 105 to the standby state.

Figure 6:
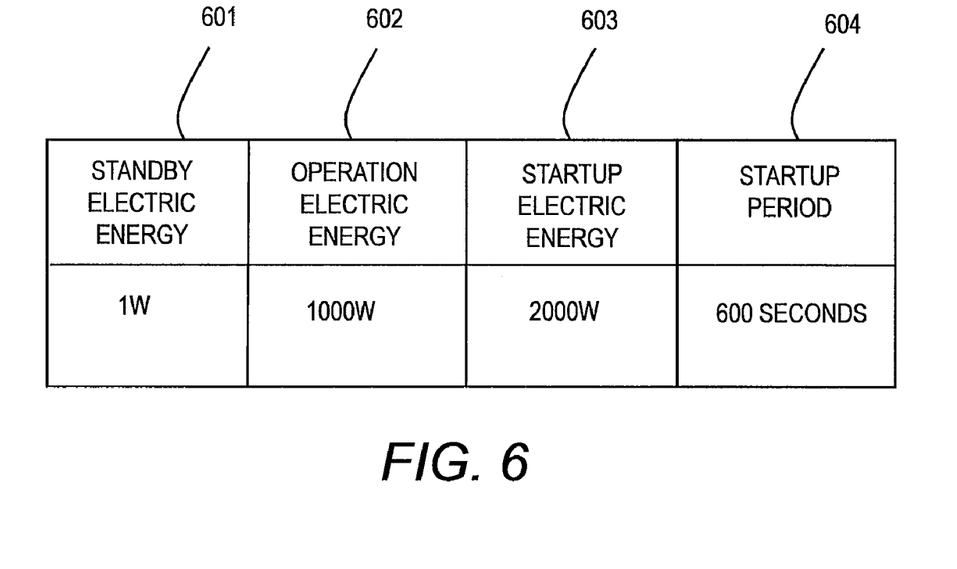
FIG. 6 describes contents of an electric energy table 307 contained in the monitoring server 108.

FIG. 6 describes contents of an electric energy table 307 contained in the monitoring server 108. The electric energy table 307 stores a standby electric energy 601, an operation electric energy 602, a startup electric energy 603, and a startup period 604 of the server 105 of the standby system 102. The standby electric energy 601 is an electric energy consumed by the server 105 of the standby system 102 in the standby state. The operation electric energy 602 is an electric energy consumed by the server 105 of the standby system 102 in the operation state. The startup electric energy 603 is a consumed electric energy required for starting the server 105 of the standby system 102 from the standby state to the operation state. The startup period 604 is a period of time required for starting the server 105 of the standby system 102 from the standby state to the operation state.

The determination unit 304 of the monitoring server 108 determines, based on the communication speed of the data update record 203 transmitted by the server 103, the processing speed of the log application unit 205, the time limit, and the standby electric energy, the operation electric energy, the startup electric energy, and the startup period of the server 105, whether the server 105 of the standby system 102 is set to the standby state.

The determination unit 304 determines whether or not to set the server 105 of the standby system 102 to the standby state according to the following way.

The communication speed of the data update record 203 is A bytes per second, the processing speed at which the log application unit 205 reflects the data update record 207 to the backup data 208 is B bytes per second, and the time limit 501 is C seconds. Moreover, the standby electric energy 601 of the server 105 is D watts, the operation electric energy 602 of the server 105 is E watts, the startup electric energy 603 of the server 105 is G watts, and the startup period 604 of the server 105 is H seconds.

Moreover, when the capacity of the data update record 207 which has not been reflected to the backup data 208 reaches the first threshold, the monitoring server 108 issues a predetermined command to stop the server 105 of the standby system 102. An example in which the monitoring server 108 notifies the server 105 of the command 502 X seconds after the monitoring server 108 stops the server 105 of the standby system 102, thereby starting the server 105, is considered.

The capacity of the data update record 207 received by the server 105 of the standby system 102 within the X+C seconds is (X+C)×A bytes. A capacity of the data update record 207 which the log application unit 205 of the server 105 can reflect to the backup data 208 within C seconds after the monitoring server 108 notifies the server 105 of the command 502 is (C−H)×B bytes. Since, C seconds after the monitoring server 108 notifies the server 105 of the command 502, the capacity of the data update record 207 which has not been reflected to the backup data 208 is zero (first threshold), there holds (X+C)×A−(C−H)×B=0.

As a result, the period of X seconds, which represents a period required until the server 105 of the standby system 102 starts, is given by the following equation.

$$X=(C-H)\times B/A-C$$

In other words, when the server 105 is set to the standby state, the server 105 stays in the standby state for (C−H)×B/A−C seconds, spends H seconds for the startup, and is set to the operation state within C−H seconds. On this occasion, a total power consumption P1 is given by the following equation.

$$P1=\{(C-H)\times B/A-C\}\times D+H\times G+(C-H)\times E$$

On the other hand, a total power consumption P2 in the case in which the server is not set to the standby state is given by the following equation.

$$P2=\{(C-H)\times B/A-C+H+C-H\}\times E=\{(C-H)\times B/A\}\times E$$

The determination unit 304 compares the two power consumptions P1 and P2 with each other, and determines to set the server 105 to the standby state when the power consumption P1 in the case in which the server 105 is started from the standby state is smaller than the power consumption P2 in the case in which the server 105 is not set to the standby state. On the other hand, when the result of the comparison of the power consumptions is P1>P2, the determination unit 304 does not set the server 105 of the standby system 102 to the standby state, and thus causes the server 105 to maintain the operation state.

As a result of the above control, when the capacity of the data update record 207 reaches the first threshold, for the period of (X+C) seconds required until the server 105 of the standby system 102 is to be started, by comparing the power consumptions P1 and P2 respectively in the standby state and the operation state with each other, and by selecting the state which provides the lower power consumption, thereby frequently starting the server 105, it is possible to prevent the power consumption from increasing compared with the case in which the server 105 operates continuously. In other words, when the startup power of the server 105 of the standby system 102 is large, and simultaneously the startup interval of the server 105 is short, the sum of the standby power and the startup power may exceed the operation power. In this case, by inhibiting the stop and start of the server 105 of the standby system 102 at predetermined periods, it is possible to prevent the power consumption from increasing.

Second Embodiment

Figure 7:
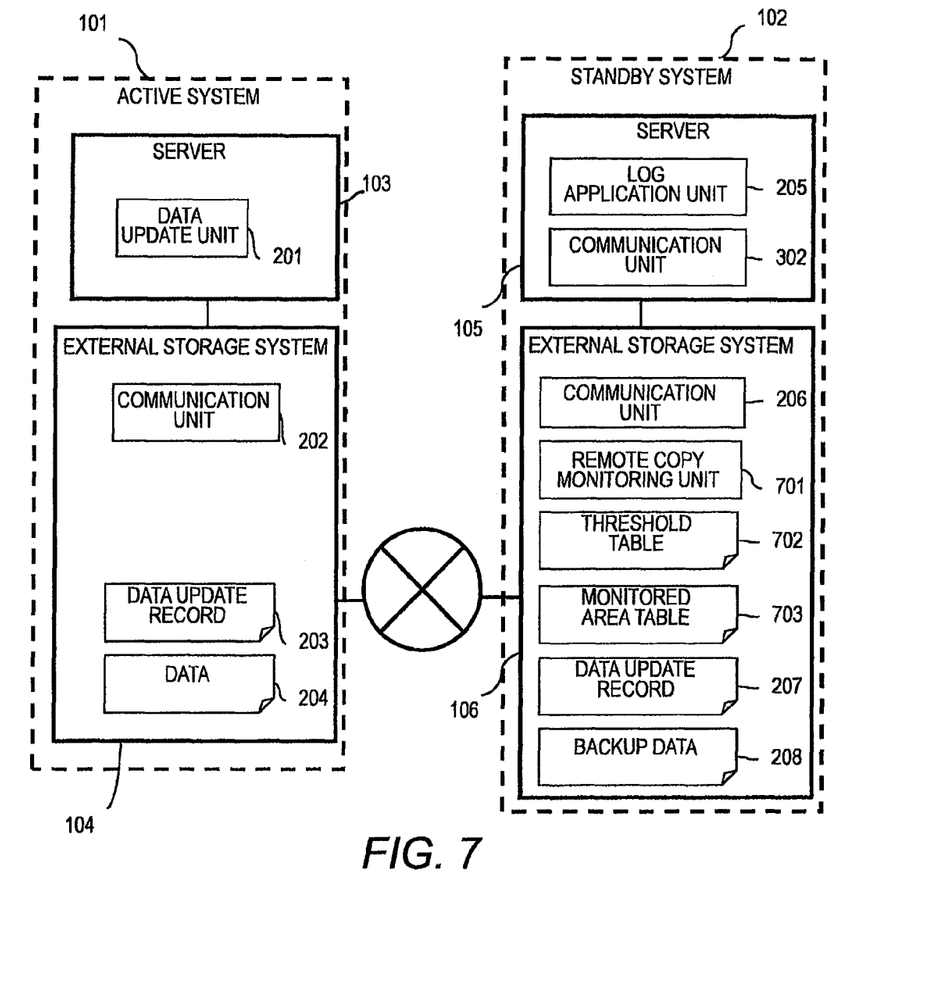
FIG. 7 is a block diagram showing a duplex system according to the second embodiment of this invention.

A description will now be given of a second embodiment with reference to drawings. FIG. 7 is a block diagram showing a duplex system according to the second embodiment of this invention. According to the second embodiment, the external storage system 106 of the standby system 102 includes a remote copy monitoring unit 701, a threshold table 702, and a monitored area table 703. In other words, the respective functions of the monitoring server 108 according to the first embodiment are integrated into the external storage system 106 of the standby system 102.

According to the second embodiment, the communication unit 302 of the server 105 of the standby system 102, when the capacity of the data update record 207 which has not been reflected to the backup data 208 reaches the first threshold (such as zero byte), sets the server 105 to the standby state.

Figure 8:
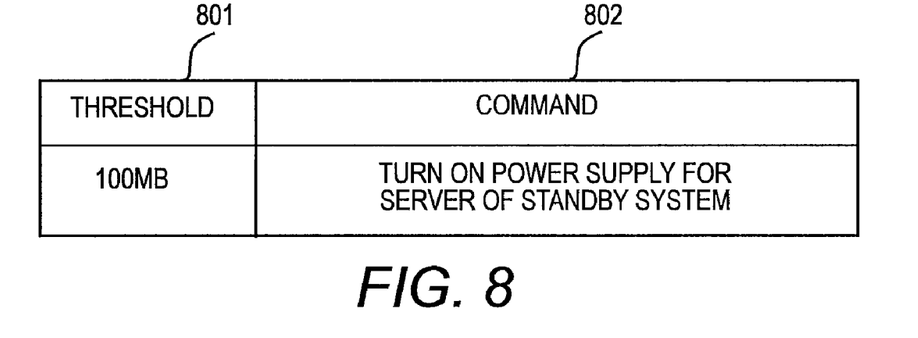
FIG. 8 describes contents of the threshold table 702 held by the external storage system 106 of the standby system 102 according to the second embodiment.

FIG. 8 describes contents of the threshold table 702 held by the external storage system 106 of the standby system 102 according to the second embodiment.

The threshold table 702 stores a threshold 801 and a command 802 for starting the server 105. The remote copy monitoring unit 701 notifies, when the capacity of the data update record received by the communication unit 206 of the external storage system 106 of the standby system 102 exceeds the threshold 801, the communication unit 302 of the server 105 of the standby system 102 of the command 802.

Figure 9:
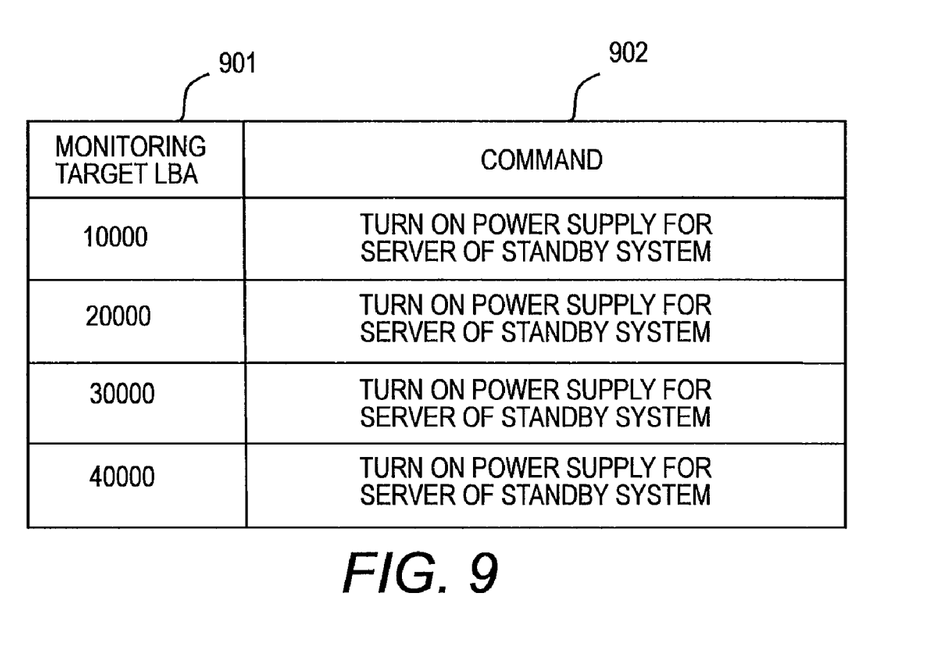
FIG. 9 describes contents of the monitored area table 703 held by the external storage system 106 of the standby system 102 according to the second embodiment.

FIG. 9 describes contents of the monitored area table 703 held by the external storage system 106 of the standby system 102 according to the second embodiment. The monitored area table 703 stores monitoring target logical block addresses (LBA's) 901 and commands 902 used for starting the server 105. The external storage system 106 partitions an area for storing data into blocks having a capacity of 512 bytes, for example, and manages these blocks by assigning an LBA thereto, respectively. This LBA is also assigned to the data update record 207, and the remote copy monitoring unit 701, when data is copied to an area specified by the monitoring target LBA 901, notifies the communication unit 302 of the server 105 of the standby system 102 of a command specified by the command 902.

To the storage system according to the second embodiment, the first embodiment may be applied, and, by causing the external storage system 106 of the standby system 102 to monitor the data update record 203 transmitted from the active system 101, and to set the server 105 of the standby system 102 to the standby state for the period (X seconds) required until the data update record 207 (log) which has not been applied to the backup data 208 is accumulated to the second threshold in the external storage system 106 of the standby system 102, it is possible to simultaneously realize the redundancy of the duplex system, and the low power consumption by applying the data update record 207 to the backup data 208 at the predetermined intervals (X+C seconds) while the power consumption of the standby system 102 is reduced. Moreover, according to the second embodiment, the monitoring server is no longer necessary, and thus, the configuration of the computer system can be simplified, thereby reducing the introduction cost.

Moreover, the first variation may be applied to the external storage system 106 of the second embodiment, whereby the remote copy monitoring unit 701 of the external storage system 106 of the standby system 102 may start the server 105 when the capacity of the data update record 203 transmitted by the active system 101 exceeds the second threshold, and may stop the server 105 when the capacity of the data update record 207 which has not been applied to the backup data 208 decreases below the first threshold.

As described above, according to the first and second embodiments, by setting the server 105 of the standby system 102 to the standby state, it is possible to reduce the power consumption. On this occasion, by causing the monitoring server 108 or the external storage system 106 of the standby system 102 to monitor the capacity of the transferred data update record 203, it is possible to solve the problem that the capacity cannot be measured by the standby system 102 in the standby state. Moreover, by determining the timing for operating the server 105 of the standby system 102 based on the time limit table 306 stored in the monitoring server 108, it is possible to solve the problem that the convenience of the system decreases due to a long period of time required for generating the backup data 208. Moreover, by determining the operation state of the server 105 of the standby system 102 based on the electric energy table 307 stored in the monitoring server 108, thereby frequently turning on and off the power supply for the server 105 of the standby system 102, it is possible to restrain the power consumption from increasing.

As described above, this invention can be applied to a backup system which transmits the log of the active system to the standby system, and generates, on the standby system, a copy of data contained in the active system based on the log, and this invention can be applied especially to a redundant system such as a disaster recovery system.

While the present invention has been described in detail and pictorially in the accompanying drawings, the present invention is not limited to such detail but covers various obvious modifications and equivalent arrangements, which fall within the purview of the appended claims.

What is claimed is:

1. A system for data backup, comprising:
a first computer system including:
  a data update unit for updating data;
  a data update record generating unit for generating a data update record of the updated data; and
  a data update record transmission unit for transmitting the data update record;
a second computer system including:
  a data update record reception unit for receiving the data update record from the first computer system;
  a data update record storage unit for storing the received data update record;
  a log application unit for generating a copy of the data contained in the first computer system based on the stored data update record; and
  a backup data storage unit for storing the copy of the data; and
a monitoring unit for monitoring the data update record transmitted by the first computer system, thereby instructing start and stop of the second computer system,
wherein the second computer system comprises:
  a second computer including the data update record reception unit and the log application unit; and
  a second storage system including the data update record storage unit and the backup data storage unit,
wherein the monitoring unit monitors the data update record transmitted by the first computer system, thereby transmitting an instruction for stopping the second computer when a predetermined first condition is satisfied, and transmitting an instruction for starting the second computer when a predetermined second condition is satisfied, and wherein the second computer comprises a communication unit for receiving the instruction from the monitoring unit, and controlling the start and stop of the second computer, and, when the second computer starts, causes the log application unit to function and to generate the copy of the data contained in the first computer system based on the data update record stored in the data update record storage unit.

2. The system for data backup according to claim 1, wherein the monitoring unit comprises:
a first monitoring unit for calculating a capacity of the data update record for which the copy of the data has not been generated of the data update record stored in the data update record storage unit;
a second monitoring unit for calculating a capacity of the data update record which has been transmitted by the first computer system;
a first determination unit for transmitting, when the predetermined first condition is that the capacity of the data update record, calculated by the first monitoring unit, for which the copy of the data has not been generated is less than a first threshold, and when the predetermined first condition is satisfied, the instruction for stopping the second computer; and
a second determination unit for transmitting, when the predetermined second condition is that the capacity of the data update record calculated by the second monitoring unit exceeds a second threshold, and when the predetermined second condition is satisfied, the instruction for starting the second computer.

3. The system for data backup according to claim 1, wherein the monitoring unit comprises:
a first monitoring unit for calculating a capacity of the data update record for which the copy of the data has not been generated of the data update record stored in the data update record storage unit;
a second monitoring unit for calculating a processing speed of the log application unit for generating the copy of the data based on the data update record stored in the data update record storage unit, and calculating a transmission speed of the data update record transmitted by the first computer system;
a first determination unit for transmitting, when the predetermined first condition is that the capacity of the data update record, calculated by the first monitoring unit, for which the copy of the data has not been generated is less than a first threshold, and when the predetermined first condition is satisfied, the instruction for stopping the second computer; and
a second determination unit for obtaining, based on the processing speed of the log application unit and the transmission speed of the data update record calculated by the second monitoring unit, as a start time, a period of time for which the log application unit can generate the copy of the data based on the data update record up to the first threshold within a predetermined time limit, and for transmitting, when the predetermined second condition is that the start time has elapsed after the second computer is stopped, and when the predetermined second condition is satisfied, the instruction for starting the second computer.

4. The system for data backup according to claim 3, wherein the monitoring unit obtains, as a first power consumption, a power consumption in a case where the second computer is stopped until the start time starts to elapse, and then is started, obtains, as a second power consumption, a power consumption in a case where the second computer operates for the start time, and, when the first power consumption is larger than the second power consumption, inhibits the first determination unit from stopping the second computer.

5. The system for data backup according to claim 1, wherein the monitoring system is included in a third computer coupled to the first computer system and the second computer system.

6. The system for data backup according to claim 1, wherein the monitoring unit is included in the second storage system.

* * * * *